Patented Dec. 15, 1953

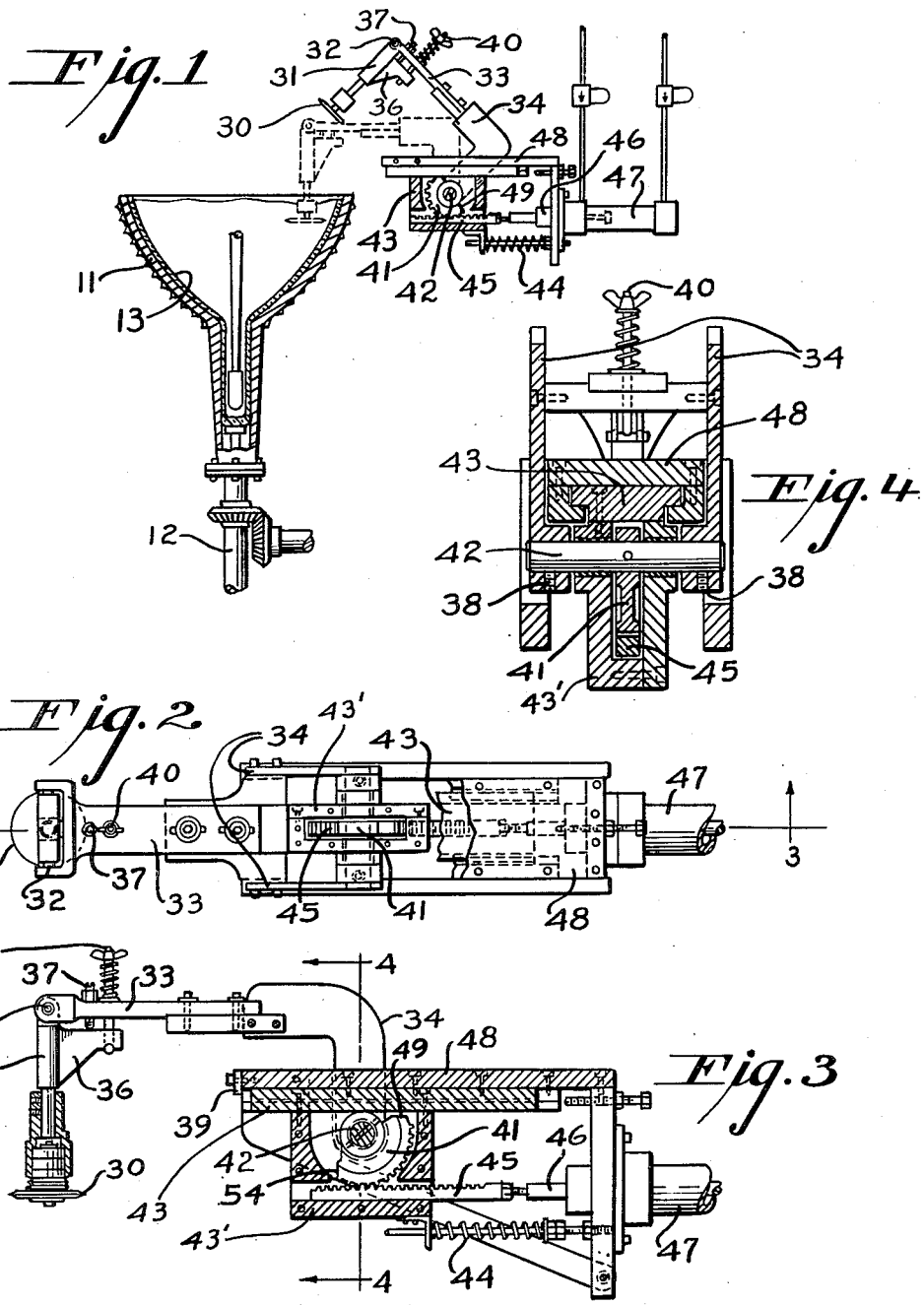

2,662,289

UNITED STATES PATENT OFFICE 2,662,289

GLASS SEVERING APPARATUS

James W. Giffen, Corning, N. Y., assignor to Corning Glass Works, Corning, N. Y., a corporation of New York Original application August 1, 1949, Serial No. 107,945. Divided and this application November 29, 1951, Serial No. 258,935

3 Claims. (Cl. 33—21)

The present invention relates to glass-severing apparatus and is particularly directed to apparatus adapted to sever or to initiate the severance of excess or undesired glass from a hollow glass article. This application is a division of my application Serial No. 107,945, filed August 1, 1949.

The primary object of the present invention is the provision of an apparatus for severing or initiating the severance of excess glass from a hollow glass article following its formation from a charge of molten glass.

A further object of the invention is to provide such an apparatus wherein severance of the excess glass occurs prior to removal of the hollow glass article from the mold in which it was formed and advantageously immediately following its formation therein.

In order to obtain a clear understanding of the present apparatus, reference is made to the accompanying drawing wherein:

Fig. 1 comprises a diagrammatic elevation, with parts in section, of a glass-working apparatus including a hollow article-forming mold and one form of excess glass-severing apparatus embodying the present invention.

Fig. 2 is an enlarged detailed plan view of the glass-severing apparatus shown in Fig. 1.

Fig. 3 is an elevation partly in section, as indicated by line 3—3, of the glass-severing apparatus as shown in Fig. 2.

Fig. 4 is an enlarged sectional view taken along the line 4—4 in Fig. 3.

Referring to the drawing in detail the numeral 11 designates a vertically arranged tubulated mold adapted for rotation about the axis of its tubulation by a shaft 12 to centrifugally form molten glass deposited within the mold cavity into a hollow glass article 13. Such a centrifugally formed article generally lacks uniformity in height (as indicated in Fig. 1); and accordingly its top edge is desirably trimmed, advantageously while the mold is still rotating.

This trimming is accomplished, in accordance with the present invention, by means of a disc 30 which is brought into the mold 11 and into engagement with the wall of the glass article 13 therein, desirably while the mold is still rotating immediately following the formation of the article therein and while the glass is still workable, to form a groove of sufficient depth to readily effect subsequent severance by thermal shear along the desired line of fracture. Disc 30 is rotatably carried at the bottom end of a support 31 pivoted at 32 on the outer end of a support 33 extending from one end of elbows 34. The disc support 31 is provided with a bracket 36 adapted to engage a stop 37 adjustable to set disc 30 at a position such that its edge will be substantially normal to the glass surface it is to engage. A spring-loaded link 40, between the bracket 36 and support 33, resiliently holds the bracket against stop 37.

Elbows 34 at their lower ends are pierced to accommodate a transverse shaft 42 fixed thereto by set screws 38 (Fig. 4). Shaft 42 also passes through a carrier 43' depending from a block 43 which is slidably supported in a frame 48 and normally held against a stop 39 (Fig. 3) by a spring 44. A sector gear 41 fixedly carried on shaft 42 is in mesh with a rack 45 fixed to the operating rod 46 of a hydraulic unit 47. By moving rack 45 back and forth the necessary turning movement is given to the gear 41 to swing the elbow 34 and its supported parts between the in-the-mold and out-of-the-mold positions as shown in Fig. 1. Flats 49 and 54 (Fig. 3) on gear 41 engage the undersurface of carrier block 43 to definitely limit the arc through which gear 41 may be turned.

When gear 41 is turned counter-clockwise and following engagement of flat 49 with the under surface of block 43 the carrier moves away from stop 39 against the tension of spring 44, thus enabling disc 30 to imbed itself in the wall of the glass article 13 to form an annular groove therein as the mold 11 and the article are rotated. During the initial movement of rack 45 in the reverse direction spring 44 moves the carrier 43' into engagement with stop 39, thereby clearing the disc 30 from the groove formed in the article, whereupon gear 41 is turned clockwise until its flat 54 engages the under surface of block 43.

Following the grooving of an article 13, it is removed from the mold 11 and passed through an annealing lehr wherein the glass to be trimmed off is separated therefrom by thermal shear substantially along the line of the groove.

The timing of the operation of the glass-severing mechanism with respect to the formation of the article in mold 11 can be readily carried out in accordance, for example, with the procedure taught in my parent application, Serial No. 107,945. The pressure applied to disc 30 can be readily modified, by suitably adjusting the tension of spring 44, to groove the article to any desired depth. In fact, complete separation in the mold by the disc 30 can be accomplished if desired. It is usually preferable, however, to form the groove to a depth of somewhat over half the article wall thickness and to effect complete severance by thermal shear, i. e., mechanical shear introduced by a thermal gradient after removal of the article from the mold as taught for example in the co-pending Giffen and Overmyer application Serial No. 107,946, filed August 1, 1949, and now Patent Number 2,529,206, issued February 24, 1953. When an article is grooved in the latter fashion, the ring of cullet cools more rapidly than does the article, and in cooling shrinks sufficiently to effect thermal shear along the groove. Irrespective of whether thermal shear occurs before or after removal of the article from the mold, the article is preferably placed in inverted position on a lehr belt and passed through an annealing lehr. If thermal shear has not been effected, the lehr belt tends to hold the temperature of the ring of cullet high while the article is cooling and severance by thermal shear is effected in the lehr.

What is claimed is:

1. An apparatus for grooving the inner surface of the wall of a hollow glass article immediately after its formation and while the glass is still workable, which includes a movable carrier, a support pivotally mounted on said carrier, resilient means holding said carrier in one of two alternative positions, a groover attached to said support, means for turning said support about its pivot to bring said groover into the article opposite the surface thereof at a desired line of severance and for then moving said carrier to impress said groover into the article surface, and means for effecting relative movement between the article and the groover to form the groove in the article surface.

2. In an apparatus for forming a groove in the inner surface of a hollow glass article following formation thereof and while the glass is still workable, a carrier, resilient means holding said carrier in one of two alternative positions, a member pivoted to said carrier and having associated therewith a freely rotatable grooving disc, means for turning said member to a position for engagement of the disc with the article, said means thereafter moving said carrier against the action of said resilient means to force said disc into the article surface, and means for effecting relative movement between the article and the disc to form the groove in the article surface.

3. An apparatus such as defined by claim 1 wherein the means for turning said support about its pivot includes a rack and gear mechanism.

JAMES W. GIFFEN.

References Cited in the file of this patent
UNITED STATES PATENTS

| Number | Name | Date |
|---|---|---|
| 117,208 | Richardson | July 18, 1871 |
| 278,845 | Atwater | June 5, 1883 |
| 537,125 | Rovensky | Apr. 8, 1895 |
| 2,169,455 | Wagner | Aug. 15, 1939 |
| 2,527,791 | Brink | Oct. 31, 1950 |
| 2,528,206 | Giffen et al. | Feb. 24, 1953 |